US012782670B2

(12) United States Patent
Nagaoka

(10) Patent No.: US 12,782,670 B2
(45) Date of Patent: Nov. 3, 2026

(54) LENS BARREL

(71) Applicant: CANON KABUSHIKI KAISHA, Tokyo (JP)

(72) Inventor: Nobuyuki Nagaoka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 18/462,607

(22) Filed: Sep. 7, 2023

(65) Prior Publication Data

US 2024/0085659 A1 Mar. 14, 2024

(30) Foreign Application Priority Data

Sep. 13, 2022 (JP) ................................ 2022-145314

(51) Int. Cl.

*G02B 7/02* (2021.01)
*G02B 7/04* (2021.01)
*G02B 7/10* (2021.01)
*G03B 17/12* (2021.01)

(52) U.S. Cl.

CPC ................ *G02B 7/04* (2013.01); *G02B 7/10* (2013.01); *G03B 17/12* (2013.01); *G02B 7/021* (2013.01)

(58) Field of Classification Search

CPC . G02B 7/04; G02B 7/10; G02B 7/021; G03B 17/12

USPC ................................ 359/694–706, 811–830

See application file for complete search history.

(56) References Cited

U.S. PATENT DOCUMENTS

| | | | | |
|---|---|---|---|---|
| 7,414,802 | B2 | 8/2008 | Noguchi | |
| 10,073,237 | B2 * | 9/2018 | Uno | H04N 23/687 |
| 2001/0017736 | A1 | 8/2001 | Nomura et al. | |
| 2002/0126398 | A1 | 9/2002 | Moriya | |
| 2008/0180812 | A1 | 7/2008 | Honsho et al. | |
| 2010/0209088 | A1 | 8/2010 | Masuki | |
| 2011/0122518 | A1 | 5/2011 | Musha et al. | |

(Continued)

FOREIGN PATENT DOCUMENTS

| | | | |
|---|---|---|---|
| JP | H04166904 | A | 6/1992 |
| JP | 2001166192 | A | 6/2001 |

(Continued)

OTHER PUBLICATIONS

Extended European Search Report issued in European Appln. No. 23195994.1 mailed Feb. 7, 2024.

(Continued)

*Primary Examiner* — Mahidere S Sahle

(74) *Attorney, Agent, or Firm* — ROSSI, KIMMS & McDOWELL LLP

(57) ABSTRACT

To provide a lens barrel suitable for miniaturization, in a lens barrel having a first lens barrel that holds a first lens and an optical unit, the first lens barrel and the optical unit are disposed adjacent to each other, an annular portion of the first lens barrel has first protruding portions in two or more phases, the first protruding portion regulates a position of the first lens in an optical axis direction, a second protruding portion of the optical unit is disposed in a phase other than the phase having the first protruding portion, and a part of the first protruding portion and a part of the second protruding portion are disposed in the same plane perpendicular to the optical axis.

13 Claims, 15 Drawing Sheets

(56) References Cited

U.S. PATENT DOCUMENTS

| | | | | |
|---|---|---|---|---|
| 2015/0160428 | A1* | 6/2015 | Kudoh | H04N 23/55 359/511 |
| 2020/0400914 | A1 | 12/2020 | Noda | |
| 2021/0381803 | A1 | 12/2021 | McDERMOT | |

FOREIGN PATENT DOCUMENTS

| | | | |
|---|---|---|---|
| JP | 2003090945 | A | 3/2003 |
| JP | 2004198742 | A | 7/2004 |
| JP | 2005316045 | A | 11/2005 |
| JP | 2006065014 | A | 3/2006 |
| JP | 2006162947 | A | 6/2006 |
| JP | 2008185786 | A | 8/2008 |
| JP | 2009244389 | A | 10/2009 |
| JP | 2011128594 | A | 6/2011 |
| JP | 5197035 | B2 | 5/2013 |
| JP | 5294914 | B2 | 9/2013 |
| JP | 2017003736 | A | 1/2017 |
| JP | 2021001937 | A | 1/2021 |

OTHER PUBLICATIONS

Communication Pursuant to Article 94(3) EPC issued in European Application No. 23195994.1 mailed Sep. 5, 2025.

* cited by examiner

LENS BARREL

BACKGROUND OF THE INVENTION

Field of the Invention

The present invention relates to a lens barrel.

Description of the Related Art

Conventionally, a lens barrel includes a zoom lens unit and a focusing unit that are movable in an optical axis direction, an adjustment group that is adjustable to improve optical performance, and the like, and various technologies for downsizing each unit have been proposed.

In Japanese Patent No. 05197035, a plurality of driving units and a second lens are disposed so as to overlap each other on a plane orthogonal to an optical axis, thereby achieving miniaturization. In Japanese Patent Application Laid-Open No. 2003-090945, a clearance in a radial direction between lens barrels is made narrower than a clearance in a radial direction between glasses that are adjacent to each other, thereby preventing collision of the glasses and realizing downsizing.

Although, in the above-mentioned Japanese Patent No. 05197035, the relation between the driving unit and the lens is taken into consideration, the configuration with respect to the adjacent lens barrel and other optical components is not taken into consideration. Additionally, in Japanese Patent Application Laid-Open No. 2003-090945, arranging the glasses close to each other is proposed, however, a further miniaturization technology in the case of limiting the clearance at a position other than the glasses is not taken into consideration.

Accordingly, one of the objects of the present invention is providing a lens barrel suitable for miniaturization.

SUMMARY OF THE INVENTION

To achieve the above object, one of aspects of the present invention is a lens barrel comprising: a first lens barrel configured to hold a first lens; and an optical unit, wherein the first lens barrel and the optical unit are disposed adjacent to each other, wherein an annular portion of the first lens barrel has first protruding portions in two or more phases, wherein the first protruding portion regulates a position of the first lens in an optical axis direction, wherein a second protruding portion of the optical unit is disposed in a phase other than the phase having the first protruding portion, and wherein a part of the first protruding portion and a part of the second protruding portion are disposed in the same plane perpendicular to the optical axis.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate descriptions will be omitted or simplified.

First Embodiment

Figure 1:
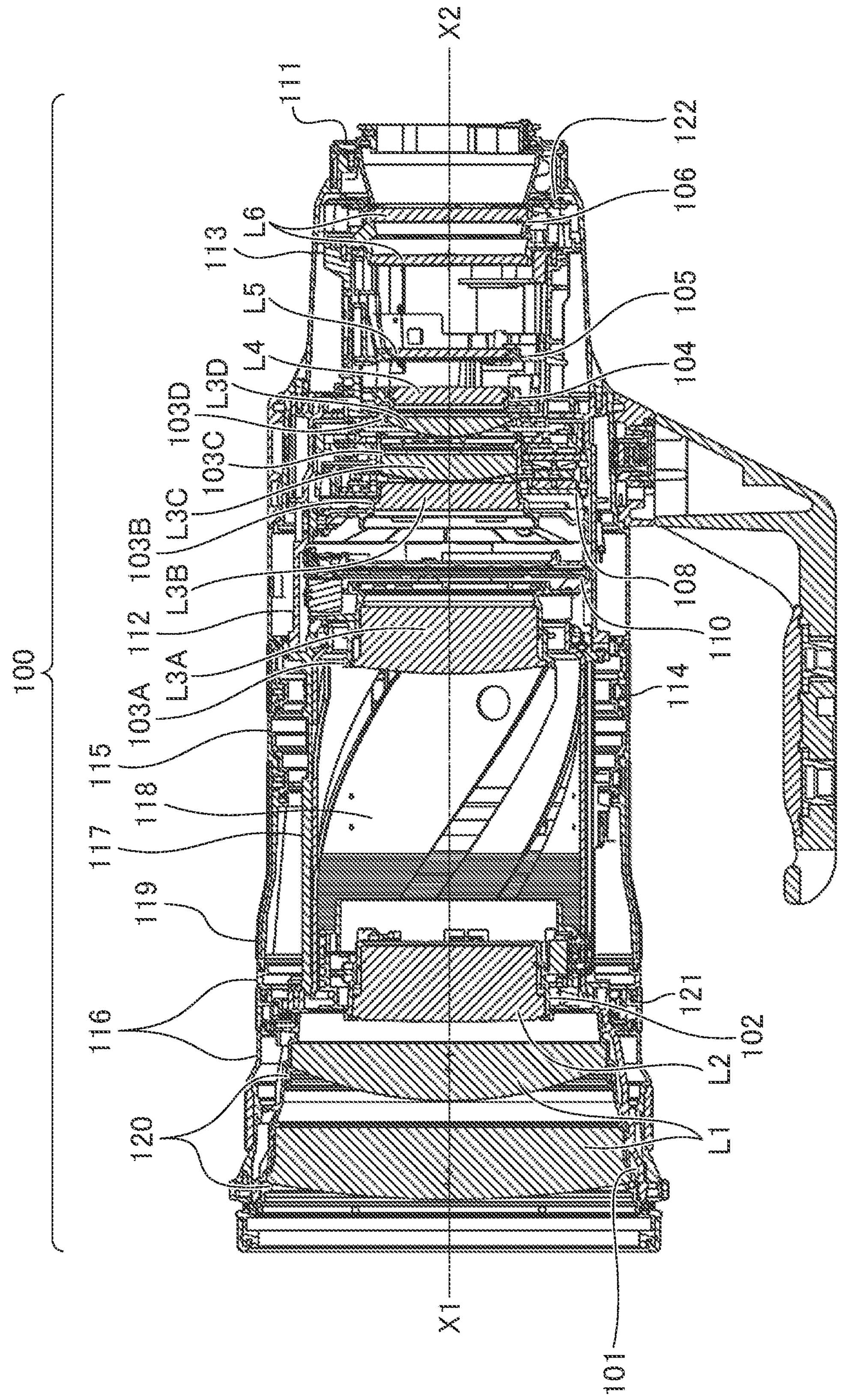
FIG. 1 is a cross-sectional view of a lens barrel in the first embodiment.
Figure 2:
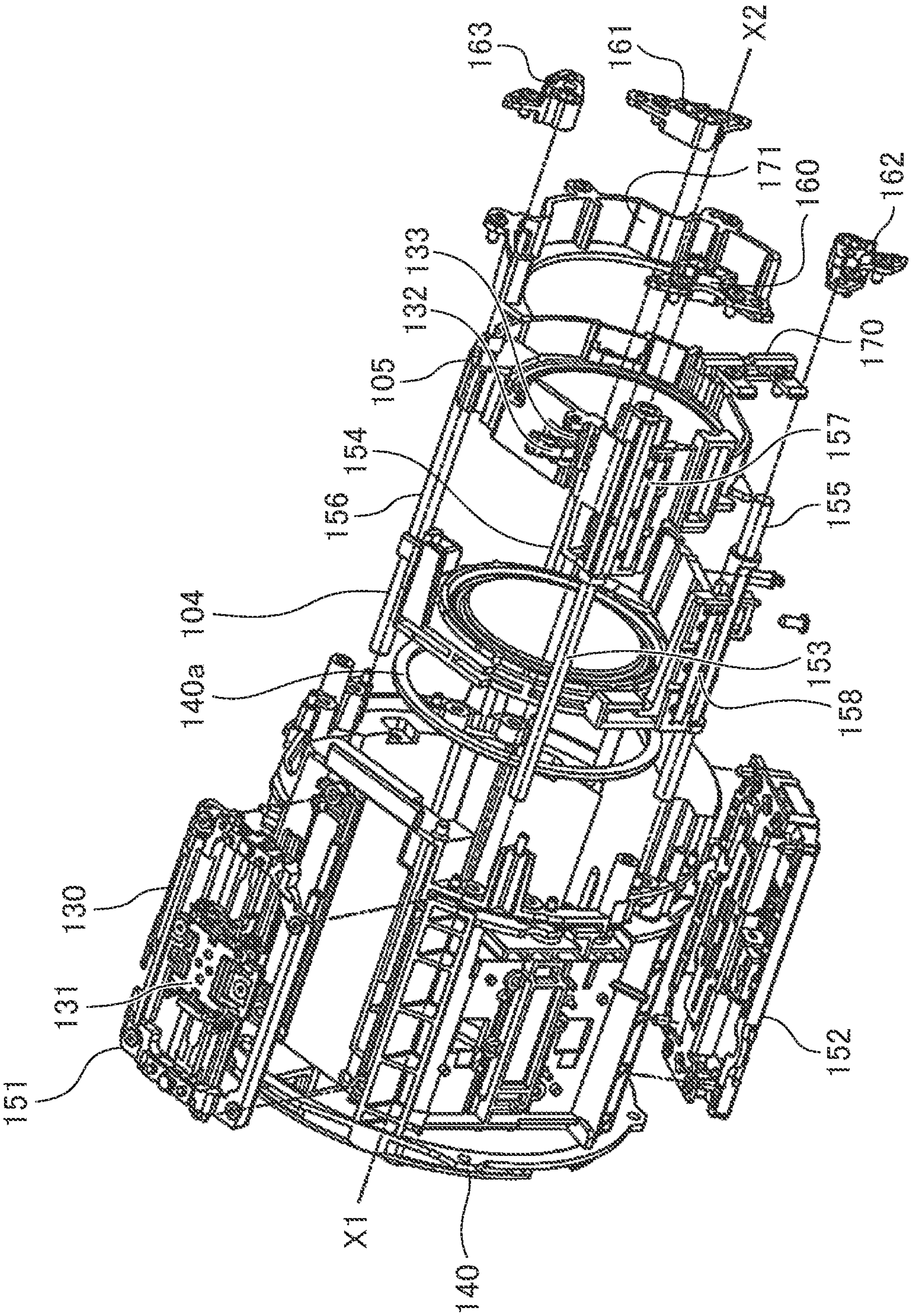
FIG. 2 is an exploded perspective view of the main part of the lens barrel in FIG. 1.

Hereinafter, the first embodiment will be described in detail with reference to the accompanying drawings. FIG. 1 is a cross-sectional view of a lens barrel in the first embodiment, and FIG. 2 is an exploded perspective view of a main part of the lens barrel in FIG. 1.

A configuration of an interchangeable lens 100 that is a lens barrel in the embodiment of the present invention will be explained with reference to FIG. 1 and FIG. 2. Note that the interchangeable lens 100 of the first embodiment is an interchangeable lens for single-lens reflex cameras. In the following explanation, with respect to the optical axis of the interchangeable lens 100, the X1 side is the object side, and the X2 side is the image plane side.

The interchangeable lens 100 of the first embodiment is a lens apparatus having a six-group configuration consisting of first to sixth lens groups L1 to L6 serving as a plurality of optical elements arranged in the optical axis direction. By a focusing operation (in-focus operation) in the interchangeable lens 100, the focus lens group that is the fourth lens group L4 and the floating lens group that is the fifth lens group L5 move in the optical axis direction.

Additionally, the second lens group L2 moves in the optical axis direction along each track determined in advance by a zoom operation (zooming or magnification varying operation) in the interchangeable lens 100.

At this time, a control unit 122 serving as a control unit controls the driving of the fourth lens group L4 and the fifth lens group L5 so that a focus position and each aberration amount changed by the zoom operation are maintained to be equal to or less than a predetermined value.

Note that the control unit 122 incorporates a CPU serving as a computer and controls the operation of each unit of the entire interchangeable lens 100 based on a computer program that is stored in a memory serving as a storage medium (not illustrated) while communicating with a CPU that is provided on the camera side (not illustrated).

A camera body (not illustrated) is the main body of an imaging apparatus that includes imaging elements such as a CCD and a CMOS. The interchangeable lens 100 is held by a user so as to be attachable to and detachable from the camera body, and a camera system is configured by the interchangeable lens 100 and the camera body.

A lens mount 111 has a bayonet portion for attachment to the camera body and is fixed to an exterior ring 113 with a screw. The exterior ring 113 is fixed to a fixed barrel 112 with a screw.

A zoom indicator and an operation switch (not illustrated) are attached to the exterior ring 113. A guide barrel 117 is fixed to the fixed barrel 112 with a screw. A straight groove for guiding each lens group in the linearly moving direction is formed on the guide barrel 117. Three phases of cam grooves corresponding to a track of the second lens group L2 during a zooming operation are formed in a cam barrel 118 that is rotatable at a fixed position with respect to the guide barrel 117.

Additionally, a zoom operation barrel 119 is radially fitted to the guide barrel 117 and is held by a fixed-position rotary roller (not illustrated) so as to be rotatable about the optical axis. The zoom operation barrel 119 is provided with a zoom key (not illustrated) connected to the cam cylinder 118, and a rotational force of the zoom operation cylinder 119 is transmitted to the cam barrel 118 by a zoom operation so that the cam cylinder 118 rotates about the optical axis.

A cam groove provided on the cam barrel 118, a cam follower provided in a second lens holding frame 102, and a straight groove provided on the guide barrel 117 act to convert the rotational force of the zoom operation barrel 119 into linear movement of the second lens holding frame 102. Additionally, the basic configuration is such that the second lens holding frame 102 moves linearly by the zoom operation. A first lens holding frame 101 that holds the first lens group L1 is fixed to the guide barrel 117 with a screw.

Next, each lens group will be described in detail. The first lens holding frame 101 is a holding frame that holds the first lens group L1. The first lens holding frame 101 is fixed to the guide barrel 117 with a screw. A lens press ring 120 is provided with a screw on the outer diameter and is screwed and fixed to a screw provided on the inner diameter of the first lens holding frame 101, and, at this time, serves as a fixation for the first lens group L1.

A protector ring is fixed to the first lens holding frame 101 with a screw (not illustrated), a recess portion for attaching a hood is provided on the outer peripheral side of the protector ring, and screws are provided on the inner peripheral side of the protector ring, so that accessories such as a hood, a cap, and a filter can be attached.

The second lens holding frame 102 is a holding frame that holds the second lens group L2. As described above, the rotations of the zoom operation barrel 119 and the cam barrel 118 are converted into the linear movement of the second lens holding frame 102, and the second lens holding frame 102 moves linearly by the zoom operation, whereby the focus length of the interchangeable lens 100 can be changed.

A third A lens holding frame 103A is a holding frame that holds a third A lens group L3A. In addition, the third A lens holding frame 103A is fixed to the guide barrel 117 with a screw. The third A lens holding frame 103A also holds an aperture unit 110 including an aperture driving unit and an aperture blade portion. A third B lens holding frame 103B is a holding frame that holds a third B lens group L3B. The third B lens holding frame 103B is held by a roller (not illustrated) with respect to the guide barrel 117.

A third C lens holding frame 103C is a holding frame that holds a third C lens group L3C. The third C lens holding frame 103C configures a part of a shake correction unit 108.

The shake correction unit 108 holds the third C lens holding frame 103C so as to be drivable in the direction orthogonal to the optical axis (the optical axis orthogonal direction), and drives the third C lens holding frame 103C by a shake correction drive unit configured by including a magnet and a coil, thereby performing shake correction. The shake correction unit 108 is held by being suspended from the fixed barrel 112 by a roller.

A third D lens holding frame 103D serving as a first lens barrel is a holding frame that holds a third D lens group L3D serving as a first lens. The third D lens holding frame 103D is fixed to a rear group base 140 with a screw. A fourth lens holding frame 104 serving as a second lens barrel is a holding frame that holds a fourth lens group L4 serving as a second lens that is a focusing unit.

The movement of the fourth lens holding frame 104 in the optical axis direction is guided by a second main guide bar 155 and a second sub-guide bar 156 that are held by the rear group base 140, a first rear group cover 160, and a second rear group cover 161. A drive is performed in the optical axis direction by a second driving unit 152, which is a driving unit, with respect to a rear group base.

Here, a driving force transmission mechanism is configured by a motor stator 130, a motor movable element 131, and a motor drive transmission unit, which configure a motor. Furthermore, the driving force transmission mechanism is configured by a second rack, which is a driving transmission member that transmits a driving force from the motor drive transmission unit to the fourth lens holding frame 104, and a second rack biasing spring that eliminates a looseness between the second rack and the motor drive transmission unit by biasing.

In the fourth lens holding frame 104, a scale for position detection in the optical axis direction is provided. Additionally, a corresponding optical sensor is provided on the rear group base 140 via a flexible printed circuit board (FPC), and thereby configuring a focus position detection unit together with the scale and the optical sensor.

A fifth lens holding frame 105 is a holding frame that holds the fifth lens group L5 that is a floating group. The movement of the fifth lens holding frame 105 in the optical axis direction is guided by a first main guide bar 153 and a first sub guide bar 154 which are held by the rear group base 140, a third rear group cover 162, and a fourth rear group cover 163 that will be described below.

The fifth lens holding frame 105 is driven in the optical axis direction with respect to the rear group base 140 by a first driving unit 151 that is a driving unit.

Here, the driving force transmission mechanism and the like have the same configuration as that in the fourth lens group L4. A sixth lens holding frame 106 is a holding frame that holds the sixth lens group L6. The sixth lens holding frame 106 is fixed to the rear group base 140 with a screw.

In the first embodiment, a configuration is adopted in which a motor using a piezoelectric element is used and the motor movable element 131 can be driven in the optical axis direction with respect to the motor stator 130, during driving of the fourth lens holding frame 104 and the fifth lens holding frame 105.

In addition, for example, a mechanism for connecting to the rack in which a stepping motor is used and a movable element and a motor drive transmission unit are used as a lead screw shaft and its screw may be adopted. In the case in which the stepping motor is used, a detection system can be eliminated and control as an open drive is possible.

The cam barrel 118 is provided with a sensor key (not illustrated) fitted to a movable element of a resistance type sensor (potentiometer) serving as a zoom position detection unit (not illustrated) fixed to the guide barrel 117, and an output of the resistance type linear sensor changes according to a rotation amount of the cam barrel 118. Since the cam barrel 118 rotates in conjunction with the rotation of the zoom operation barrel 119, zoom position information can be detected.

A focus operation barrel 114 is held so as to be rotatable at a fixed position outside an intermediate outer ring 115. The focus operation barrel 114 detects a rotation amount and a direction of the focus operation barrel 114 by a light detection element that is provided on the guide barrel 117 and a scale that is provided on an inner diameter of the focus operation barrel 114 and has a black and white light and dark portion.

A multi-purpose operation tube 121 is held by a front exterior tube 116 so as to be rotatable at a fixed position outside the first lens holding frame 101. The multi-purpose operation tube 121 has a plurality of teeth with respect to a photo interrupter provided in the first lens holding frame 101, and detects a rotation amount and a direction of the multi-purpose operation tube 121.

The control unit 122 controls the entire interchangeable lens 100 including focus drive control, the aperture unit 110, and the shake correction unit 108, and is fixed to the rear group base 140 with a screw.

Figure 3:
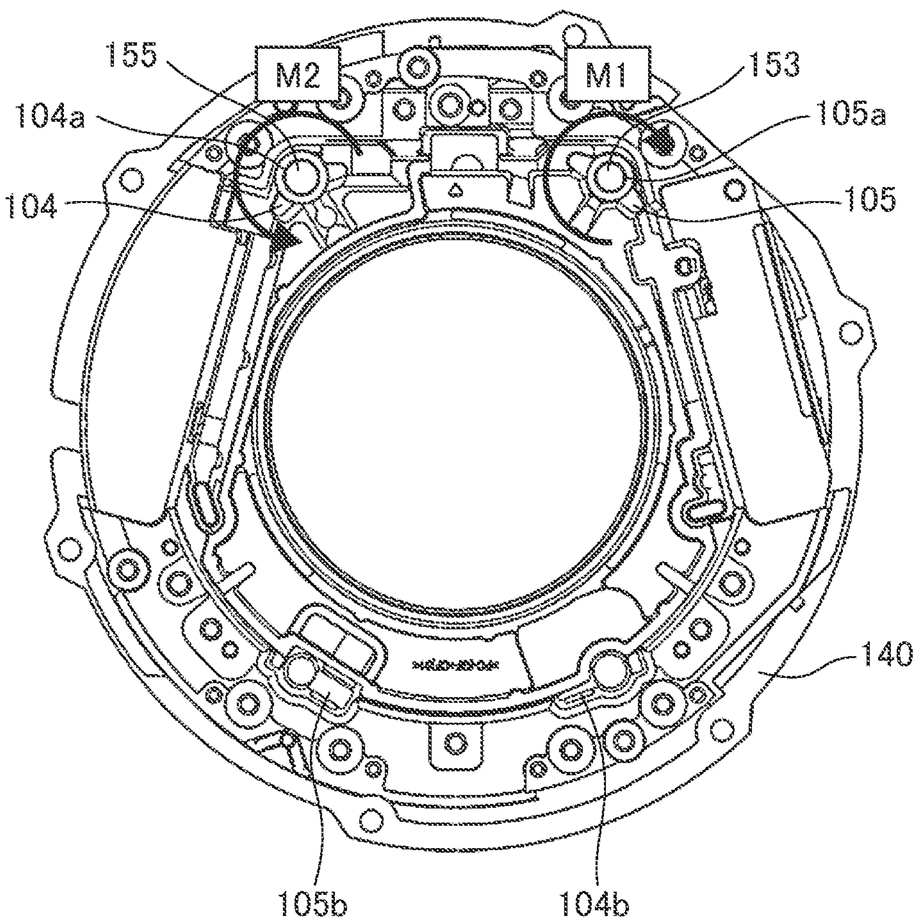
FIG. 3 is a view of the main part as viewed from the X2 direction of the optical axis.
Figure 4:
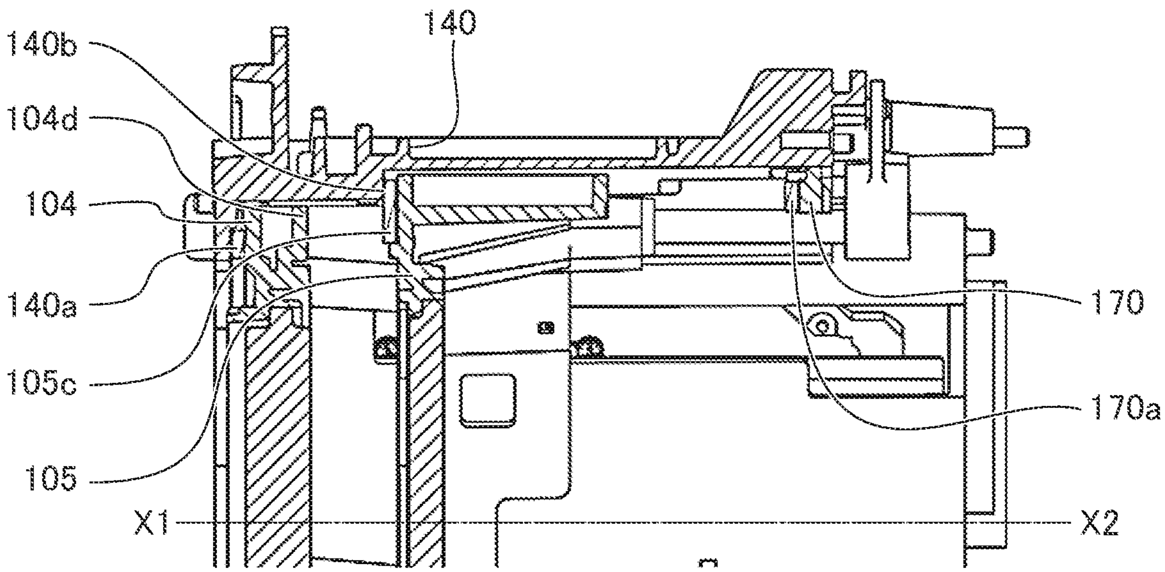
FIG. 4 is a cross-sectional view of the main part.

Next, a structure of the main part of the lens barrel will be explained with reference to FIG. 2 to FIG. 4. FIG. 2 is an exploded perspective view of the main part of the lens barrel in FIG. 1, as described above. FIG. 3 is a view of the main part as viewed from a X2 direction of the optical axis. FIG. 4 is a cross-sectional view of the main part. The fourth lens group L4 held by the fourth lens holding frame 104 is a focusing group, and is driven in the optical axis direction by the second driving unit 152.

Front ends of the second main guide bar 155 and the second sub-guide bar 156 are held by the rear group base 140, and rear ends thereof are held by the first rear group cover 160 and the second rear group cover 161 that are fastened and fixed to the rear group base 140.

The second main guide bar 155 and the second sub-guide bar 156 guide the movement of the fourth lens holding frame 104 in the optical axis direction, and the second main guide bar 155 is engaged with a sleeve hole 104*a* of the fourth lens holding frame 104. Additionally, a second rack biasing spring is provided between the fourth lens holding frame 104 and the second driving unit 152.

The movable portion of the second driving unit 152 and the second rack are engaged with each other at a portion (not illustrated), and a rotation M2 around the shaft of the second main guide bar 155 is generated in the fourth lens holding frame 104 due to a biasing force of the second rack biasing spring. Furthermore, the second sub-guide bar 156 and a bearing 104*b* fixed to the fourth lens holding frame 104 are brought into contact with each other, whereby the position of the fourth lens holding frame 104 with respect to the rear group base 140 is determined.

The position of the fourth lens holding frame 104 in the optical axis direction with respect to the rear group base 140 is read by detecting a second scale 158 fixed to the fourth lens holding frame 104 by a position sensor (not illustrated) fixed to the rear group base 140.

As described above, the fifth lens group L5 held by the fifth lens holding frame 105 is a floating group, and is driven in the optical axis direction by the first driving unit 151. Front ends of the first main guide bar 153 and the first sub-guide bar 154 are held by the rear group base 140, and rear ends thereof are held by the third rear group cover 162 and the fourth rear group cover 163 that are fastened and fixed to the rear group base 140.

The first main guide bar 153 and the first sub guide bar 154 guide the movement of the fifth lens holding frame 105 in the optical axis direction, and the first main guide bar 153 is engaged with a sleeve hole 105*a* of the fifth lens holding frame 105. Furthermore, a first rack bias spring 133 that is provided to be rotatable to the first rack 132 and generates a biasing force that rotates the first rack 132 is provided.

The movable portion of the first driving unit 151 and the first rack 132 are engaged with each other at a position (not illustrated), and a rotation M1 around the shaft of the first main guide bar 153 is generated in the fifth lens holding frame 105 due to a biasing force of the first rack biasing spring 133.

Furthermore, the first sub guide bar 154 and a bearing 105*b* fixed to the fifth lens holding frame 105 come into contact with each other, whereby the position of the fifth lens holding frame 105 with respect to the rear group base 140 is determined.

The position of the fifth lens holding frame 105 in the optical axis direction with respect to the rear group base 140 is read by detecting a first scale 157 held by the fifth lens holding frame 105 by a position sensor (not illustrated) fixed to the rear group base 140.

Although, in the explanation of the first embodiment, the fifth lens group L5 is the floating lens group, the fourth lens group L4 is the focusing lens group and the two lens groups are driven during focus adjustment, the present invention is not limited thereto. For example, one may be a group that moves during magnification variation, and the other may be a group that moves during focus adjustment.

Next, the positional relation of the shock-absorbing materials will be explained. The fifth lens holding frame 105 is held so as to be movable, for example, between the shock-absorbing material 180 (not illustrated) and the fixed-side contact surface 140*b*, and between the fifth lens holding frame 105 and shock-absorbing material 170*a*. The fourth lens holding frame 104 is held so as to be movable within a moving range defined between a shock-absorbing material 140*a* and the shock-absorbing material 170*a* and the like.

In the first embodiment, a first cover member 170 is configured such that the lens barrels do not come into contact with each other when the fifth lens holding frame 105 moves to the moving ends on the object side and the image plane side. This is because, if one of the moving ends is determined only by the contact between the lens barrels, the possibility of collision between the lens barrels facing each other increases, and therefore, the moving ends that are determined between the lens barrels and the rear group base 140 that is a fixed portion, the first cover member 170, and a second cover member 171 are provided.

Figure 5:
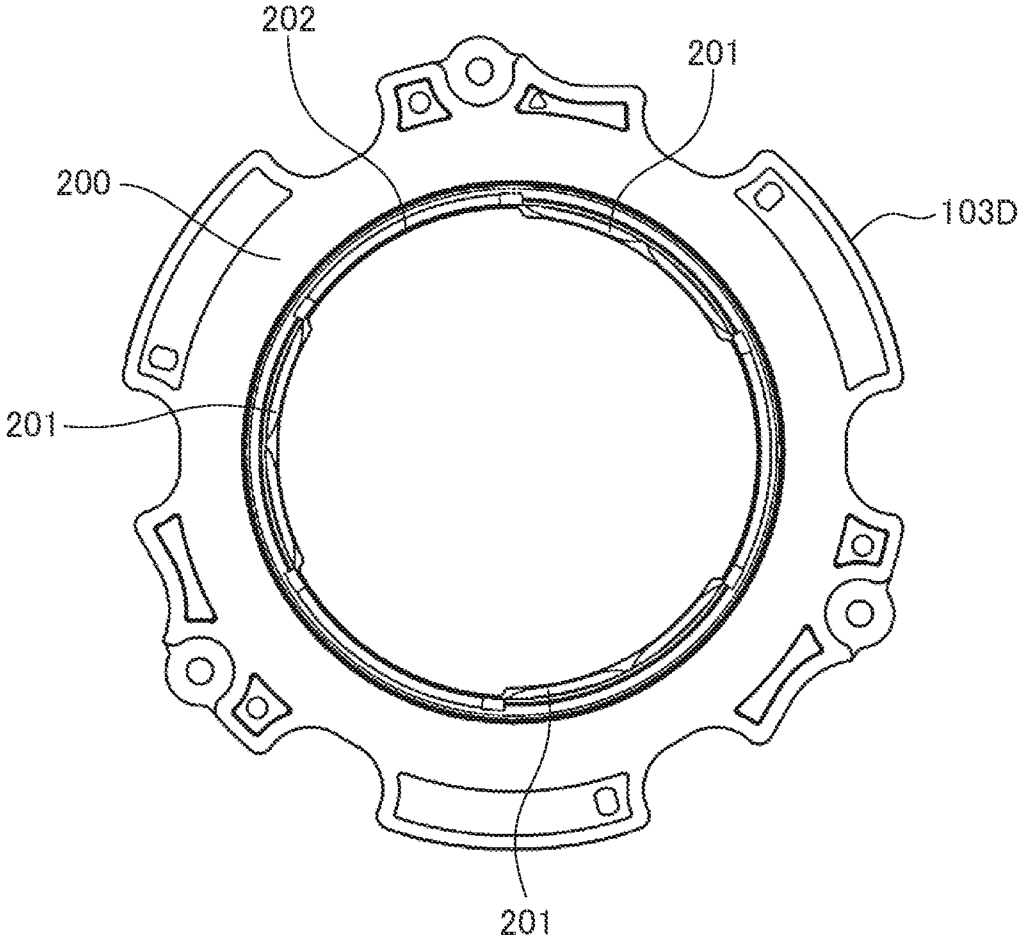
FIG. 5 is a diagram of a unit including a 3D lens holding frame excluding a first sheet as viewed from the X1 direction of the optical axis.
Figure 6:
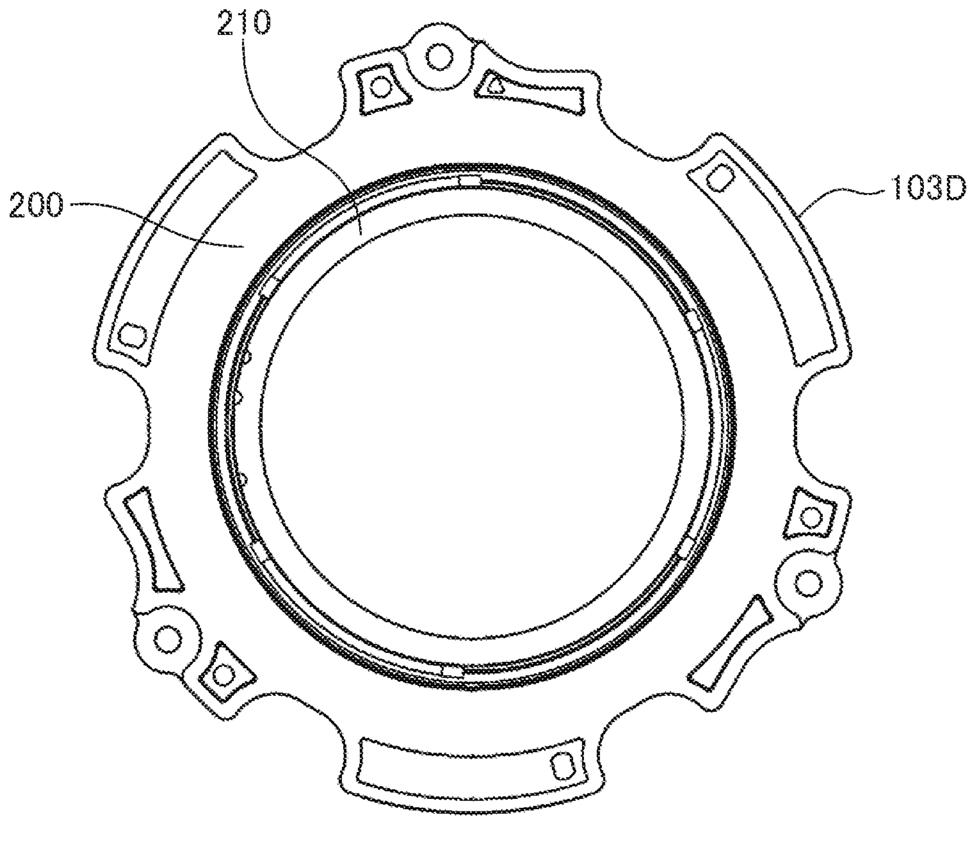
FIG. 6 is a diagram of the unit including the 3D lens holding frame as viewed from the X1 direction of the optical axis.

Next, a characteristic configuration of the present patent will be explained with reference to FIG. 5 to FIG. 9. FIG. 5 is a diagram of a unit including the third D lens holding frame excluding a first sheet as viewed from the X1 direction of the optical axis. FIG. 6 is a diagram of the unit including the third D lens holding frame as viewed from the X1 direction of the optical axis.

Figure 7:
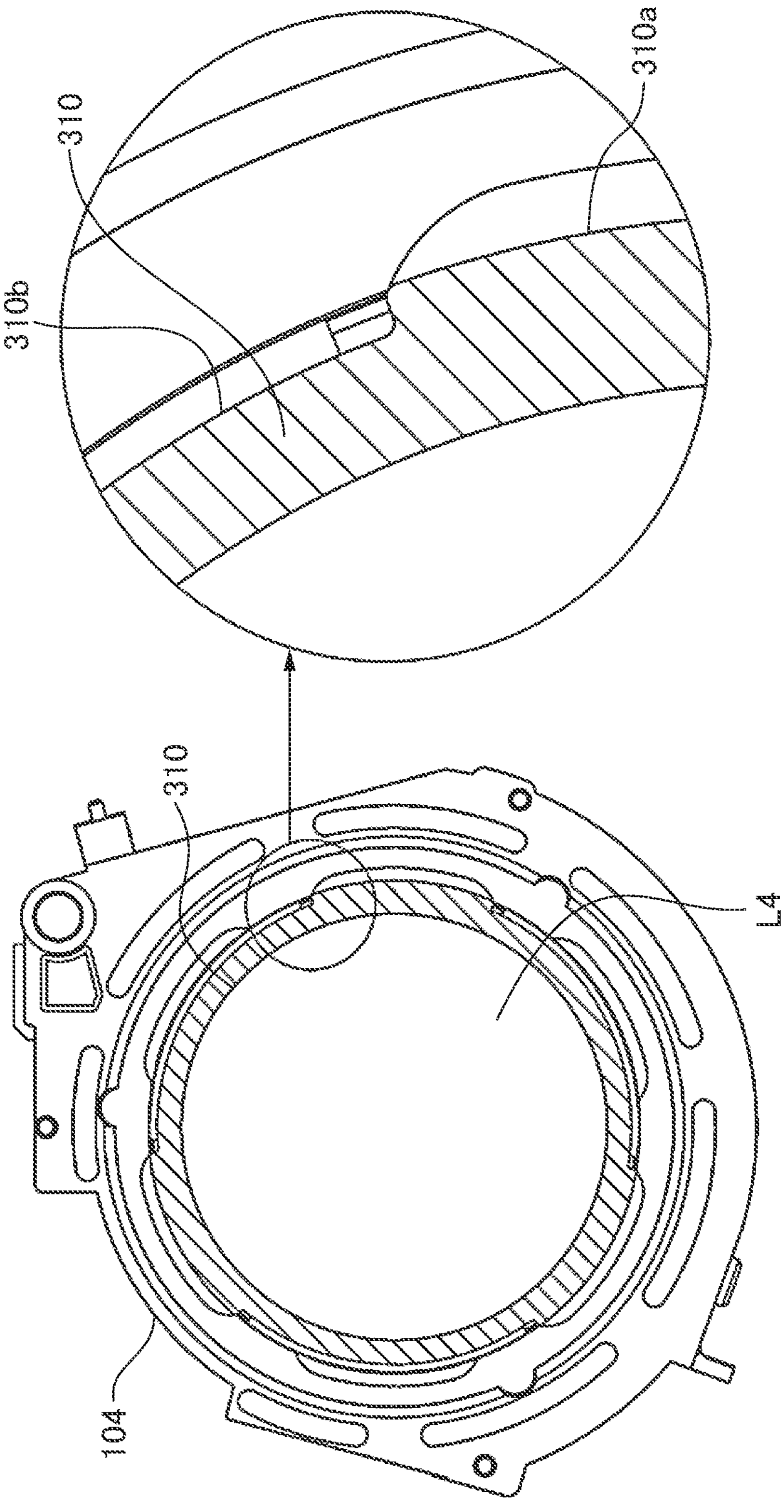
FIG. 7 is a diagram of the unit including a fourth lens holding frame as viewed from the X2 direction of the optical axis.
Figure 8:
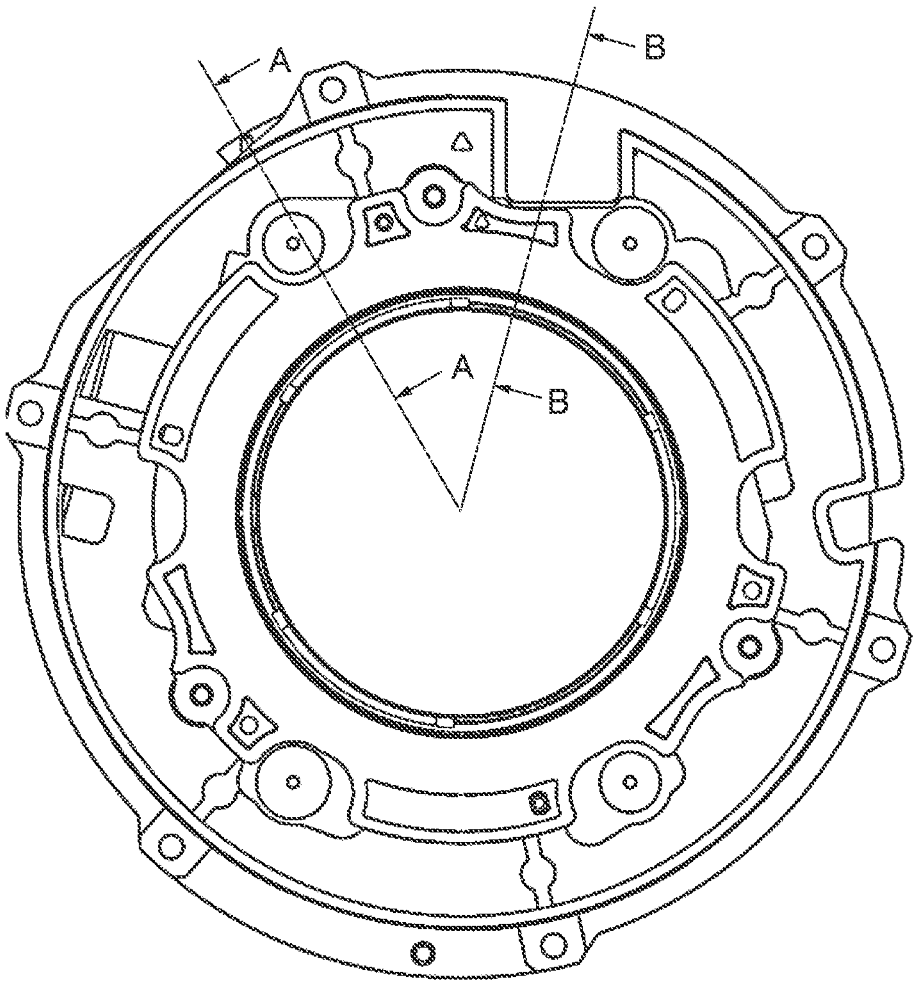
FIG. 8 is a diagram of the unit as viewed from the X1 direction of the optical axis.
Figure 9A:
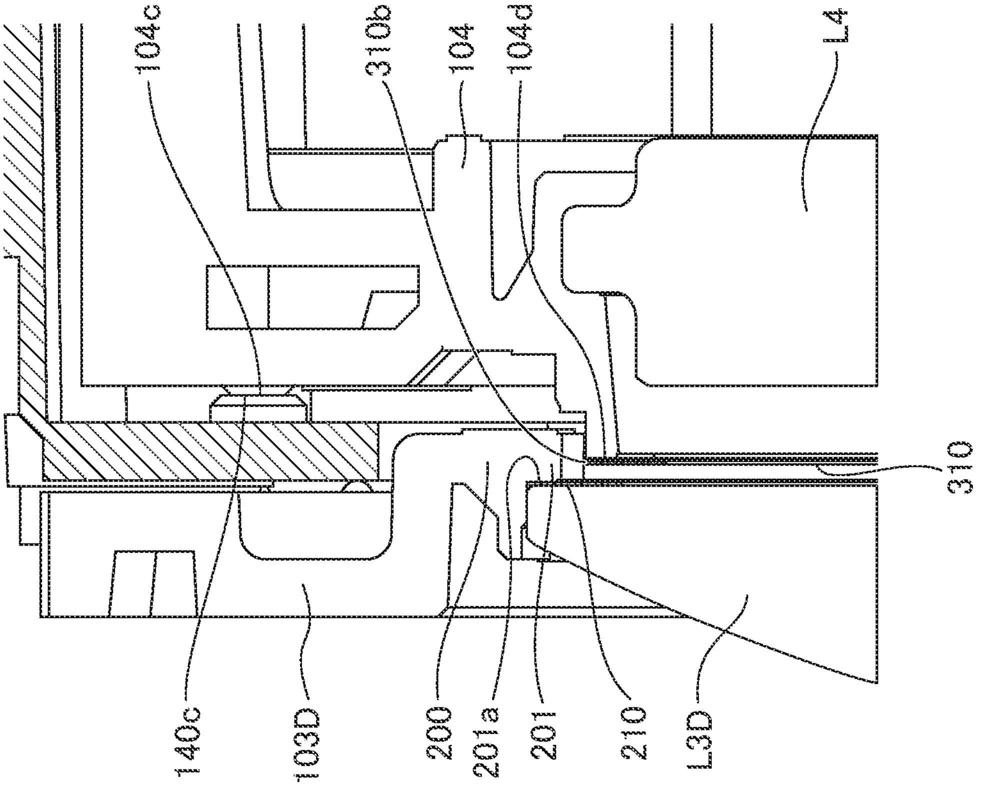
FIGS. 9A and 9B are cross-sectional views of the unit in the first embodiment.
Figure 9B:
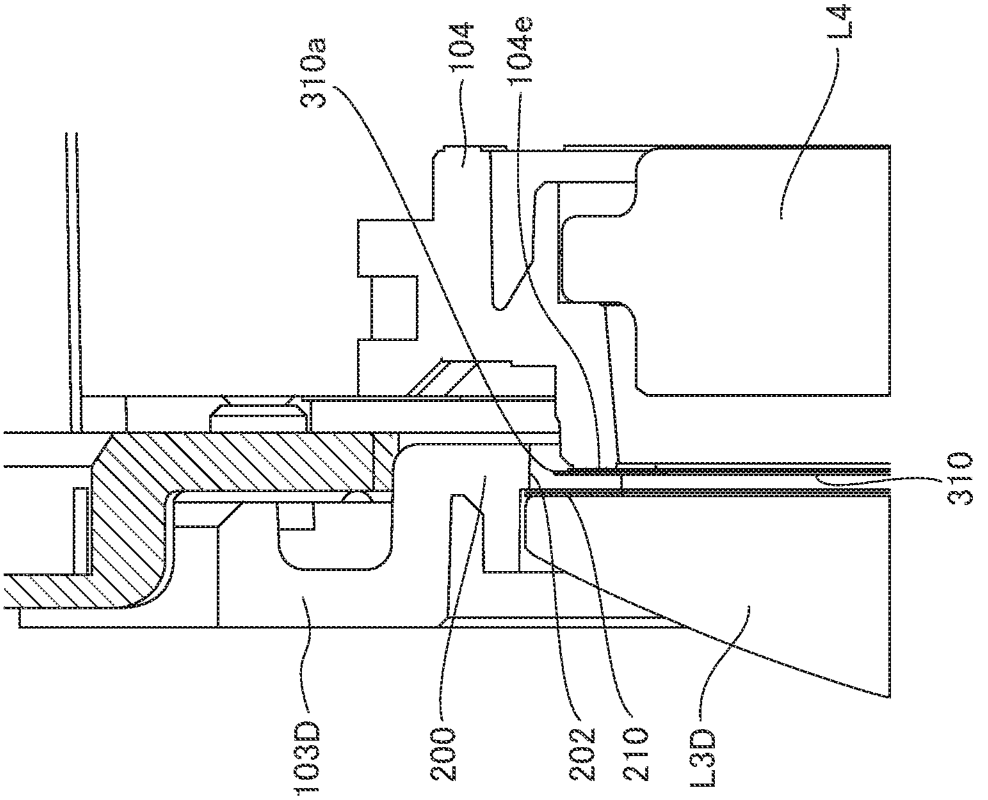

FIG. 7 is a diagram of the unit including the fourth lens holding frame as viewed from the X2 direction of the optical axis. FIG. 8 is a diagram of the unit as viewed from the X1 direction of the optical axis. FIG. 9A is a sectional view along a line A-A in FIG. 8 of the unit in the first embodiment. FIG. 9B is a sectional view along with a line B-B in FIG. 8 of the unit.

As shown in FIG. 5, the third D lens holding frame 103D serving as the first lens barrel has an annular portion 200. In the three phases (phase in a circumferential direction of the optical axis direction) of the annular portion 200, a receiving portion 201 serving as a first protruding portion that protrudes from the annular portion 200 in a direction orthogonal to the optical axis and holds the third D lens group L3D serving as a first lens is provided. Additionally, a recess portion 202 is provided in a phase other than the phase having the receiving portion 201. Note that it suffices if the first protruding portions are provided in two or more phases of the annular portion 200.

As shown in FIG. 9A, the receiving portion 201 is a protruding portion that protrudes from the annular portion 200 toward a direction orthogonal to the optical axis, and a direction orthogonal to the protruding direction of the protruding portion is a position regulating surface 201*a* that regulates the position of the third D lens group L3D in the optical axis direction. A first light shielding sheet 210 is provided between the third D lens group L3D serving as the first lens and the receiving portion 201 serving as the first protruding portion.

The first light shielding sheet 210 is disposed in order to shield an unnecessary light beam that leaks from the recess portion 202, and as shown in FIG. 6, the outer diameter of the first light shielding sheet 210 is set to be larger than the outer diameter of the recess portion 202.

By disposing such a first light shielding sheet 210, it is possible to prevent light beam leakage by the first light shielding sheet 210 even when the phase other than the first protruding portion is formed as a recess portion penetrating in the optical axis direction.

As shown in FIG. 9, an end portion 104*d* is provided in a phase corresponding to the receiving portion 201 on the object-side end surface of the fourth lens holding frame 104 serving as the second lens barrel, and a ring-shaped second light shielding sheet 310 as shown in FIG. 7 is attached to the end portion 104*d*.

Additionally, an end portion 104*e* serving as a second protruding portion is provided in a phase corresponding to the recess portion 202 on the object-side end surface of the fourth lens holding frame 104, and the outer-diameter-side protruding portion 310*a* of the second light shielding sheet 310 is attached to the end portion 104*e*. Thus, the second light shielding sheet is disposed on the first lens side of the second protruding portion. Thus, the second protruding portion of the optical unit is disposed in a phase other than the phase in which the receiving portion 201 serving as the first protruding portion is provided.

Note that the outer-diameter-side protruding portion 310*a* is a portion where the second light shielding sheet 310 extends to the outer diameter side, and the end portion 104*e* extends (or is shifted) more toward the outer diameter side from the end portion 104*d*. Note that the outer-diameter-side protruding portion 310*b* having a smaller diameter than the outer-diameter-side recess portion 310*a* is disposed in the same phase as the receiving portion 201 on the second light shielding sheet 310.

FIGS. 9A and 9B show a case in which the fourth lens holding frame 104 is moved closest to the object side, and the movement of the fourth lens holding frame 104 is regulated by the contact between the movement regulating portion 140*c* of the rear group base 140 and the mechanical end portion 104*c* of the fourth lens holding frame 104.

That is, FIG. 9 shows a state in which the third D lens holding frame 103D and the fourth lens holding frame 104 have moved to the mechanical end on the object side of the fourth lens holding frame 104. At this time, in the phase as shown in FIG. 9A, the receiving portion 201, the outer diameter side recess portion 310*b* of the second light shielding sheet 310, and the end portion 104*d* are arranged in the same plane perpendicular to the optical axis.

Additionally, in the phase as shown in FIG. 9B, the recess portion 202, the outer-diameter-side protruding portion 310*a* of the second light shielding sheet 310, and the end portion 104*e* are arranged in the same plane perpendicular to the optical axis. In such a manner, a part of the first protruding portion and a part of the second protruding portion are located in the same plane perpendicular to the optical axis.

In the conventional configuration, it is necessary to provide a clearance in the optical axis direction between the receiving portion 201 and a shaped portion of the other lens barrel so that the interference is prevented. In the first embodiment, the configuration is adopted in which the receiving portions 201 are arranged, for example, only in three phases as viewed from the optical axis direction, and the outer diameter side protruding portion 310*a* and the end portion 104*e* enter the other phases.

Therefore, the clearance between the third D lens holding frame 103D and the fourth lens holding frame 104 in the optical axis direction can be made smaller than that in the conventional configuration.

Consequently, the clearance between the lens barrels in the optical axis direction can be reduced, and miniaturization of the entire lens barrel can be realized. Additionally, when an impact is received in a state in which the third D lens group L3D and the fourth lens group L4 are closest to each other, the first light shielding sheet 210 and the second light shielding sheet 310 come into contact with each other first, so that the glasses do not collide with each other.

By the above configuration, even when the clearance between the lens groups is narrowed, the possibility of damage of the glass can be reduced. Thus, the first light shielding sheet 210 and the second light shielding sheet 310 also have a function as a shock-absorbing material.

Note that, although, in the explanation of the first embodiment, the clearance shape (recess portion 202) other than the receiving portion 201 is a shape penetrating in the optical axis direction, the shape may be a shape recessed in the optical axis direction only in a phase in which the end portion 104*e* is located. Additionally, the location phases of the receiving portion 201 (first protruding portion) and the end portion 104*e* (second protruding portion) need not necessarily be three phases.

In addition, although, in the explanation of the first embodiment, the first lens barrel is a fixed lens barrel, the optical unit is a second lens barrel that holds a lens, and the second lens barrel is a focusing unit that is movable in the optical axis direction, the optical unit may be an optical adjustment group (optical adjusting unit) or a zoom lens unit. Note that the first lens barrel and the optical unit are disposed adjacent to each other.

Second Embodiment

The second embodiment is a modified example of the configuration described in the first embodiment in which some components are replaced. Descriptions regarding some of the component layouts that are duplicate will be omitted because the descriptions have already been provided in the first embodiment. In the second embodiment, the first lens barrel is an optical adjustment group that has an adjustment lens unit that is adjustable in the optical axis direction, and an optical unit is a focusing unit that is movable in the optical axis direction.

Figure 10:
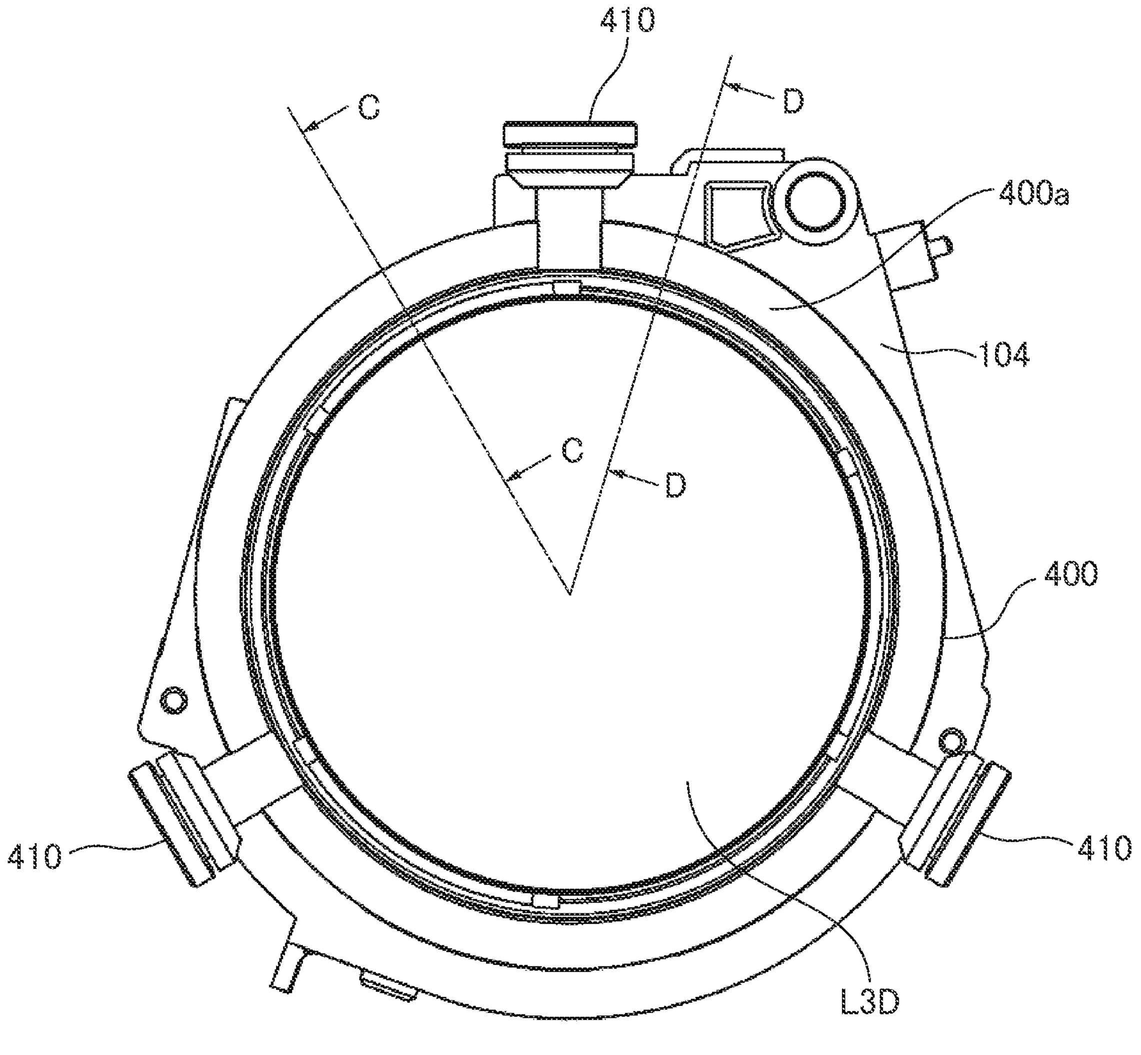
FIG. 10 is a diagram of the unit including the 3D lens holding frame as viewed from the X1 direction of the optical axis in the second embodiment.
Figure 11B:
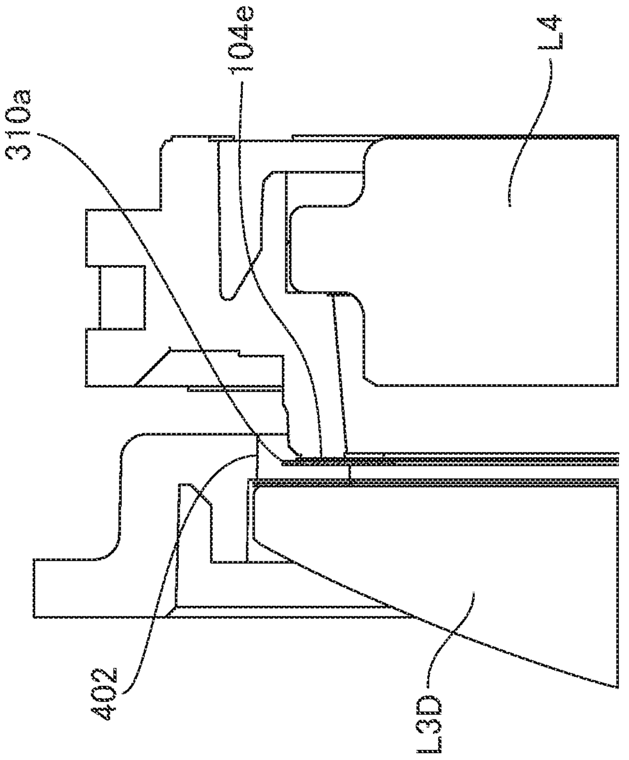
FIGS. 11A and 11B are cross-sectional views of the unit in the second embodiment.
Figure 11A:
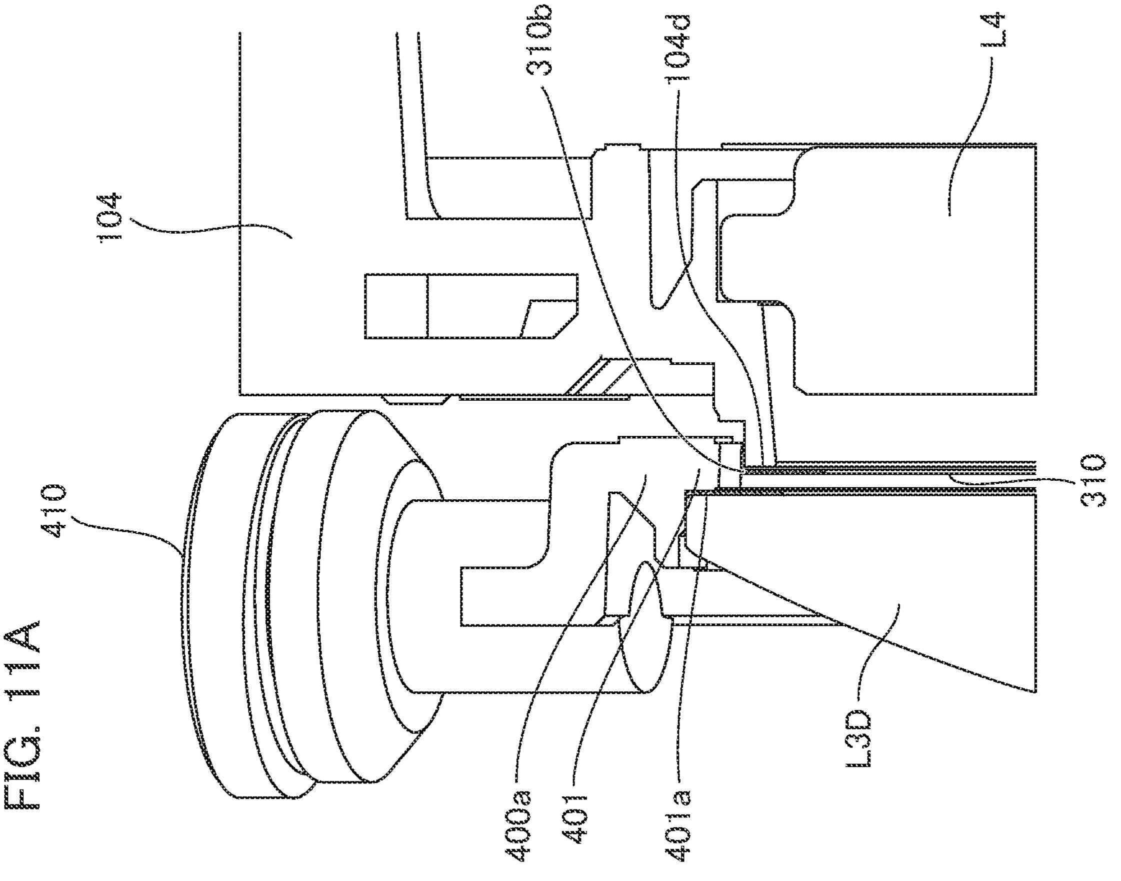

FIG. 10 is a diagram of the unit including the third D lens holding frame as viewed from the X1 direction of the optical axis in the second embodiment. FIGS. 11A and 11B are cross-sectional views of the unit in the second embodiment, showing a state in which the glasses are closest to each other. The third D lens holding frame 400 serving as the first lens barrel has adjustment rollers 410 disposed in three phases, and is held by a fixing member (not illustrated) via the adjustment rollers 410.

By rotating the adjustment roller 410, the tilt, the eccentricity, or the position in the optical axis direction of the 3D lens holding frame 400 can be adjusted. That is, the configuration is adopted in which the clearance between the third D lens unit and the fourth lens unit is changed by the optical adjustment.

The third D lens holding frame 400 has an annular portion 400*a* and a receiving portion 401 serving as a first protruding portion that protrudes from the annular portion 400*a* in a direction orthogonal to the optical axis and for holding the third D lens group L3D serving as a first lens (refer to FIG. 11A). In contrast, in phases other than the receiving portion 401, recess portions 402 are provided (refer to FIG. 11B).

The receiving portion 401 is a protruding portion that protrudes from the annular portion 400*a* toward a direction orthogonal to the optical axis, and the protruding portion has a position regulating surface 401*a* in the optical axis direction of the third D lens group L3D. The fourth lens holding frame 104 serving as a second lens barrel is held by the rear group base 140 so as to be movable in the optical axis direction as a focusing unit, similarly to the first embodiment.

In the second embodiment, the receiving portion 401 serving as the first protruding portion, the outer diameter side recess portion 310*b* of the second light shielding sheet 310, and the end portion 104*d* serving as the second protruding portion are arranged in the same plane perpendicular to the optical axis. The receiving portions 401 are arranged in, for example, only three phases when viewed from the optical axis direction, and the outer-diameter-side protruding portion 310*a* of the second light shielding sheet 310 and the end portion 104*e* enter the other phases.

Therefore, the clearance between the third D lens holding frame 400 and the fourth lens holding frame 104 in the optical axis direction can be made smaller than that in the conventional configuration.

Therefore, the clearance between the lens barrels in the optical axis direction can be reduced, and miniaturization of the entire lens barrel can be realized. Additionally, in the explanation of the second embodiment, although the first lens barrel is an optical adjustment group, and the optical unit is a focusing unit that is movable in the optical axis direction, the optical unit may be a fixed lens barrel or a zoom lens unit that is movable in the optical axis direction. That is, the first lens barrel and the optical unit may respectively be a focusing unit and a zoom lens unit.

Third Embodiment

The third embodiment is a modified example of the configuration described in the first embodiment in which some components are replaced. Descriptions regarding some of the component layouts that are duplicate will be omitted because the descriptions have already been provided in the first embodiment. In the third embodiment, the first lens barrel is a zoom lens unit that is movable in the optical axis direction, and an optical unit is a focusing unit that is movable in the optical axis direction.

Figure 12:
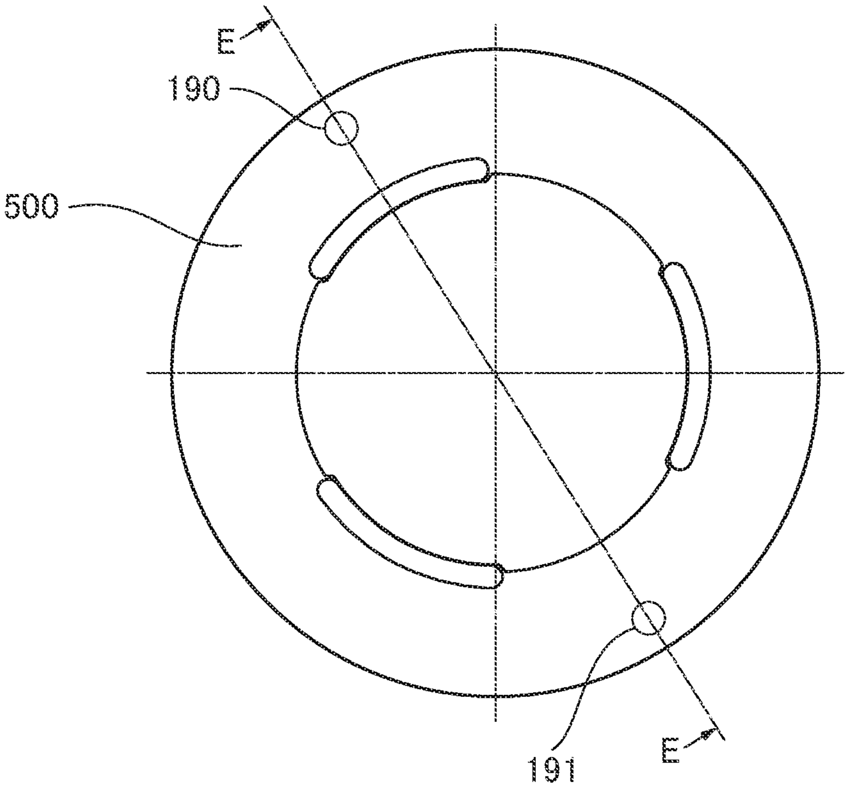
FIG. 12 is a diagram of the unit including the 3D lens holding frame as viewed from the X1 direction of the optical axis in the third embodiment.
Figure 13:
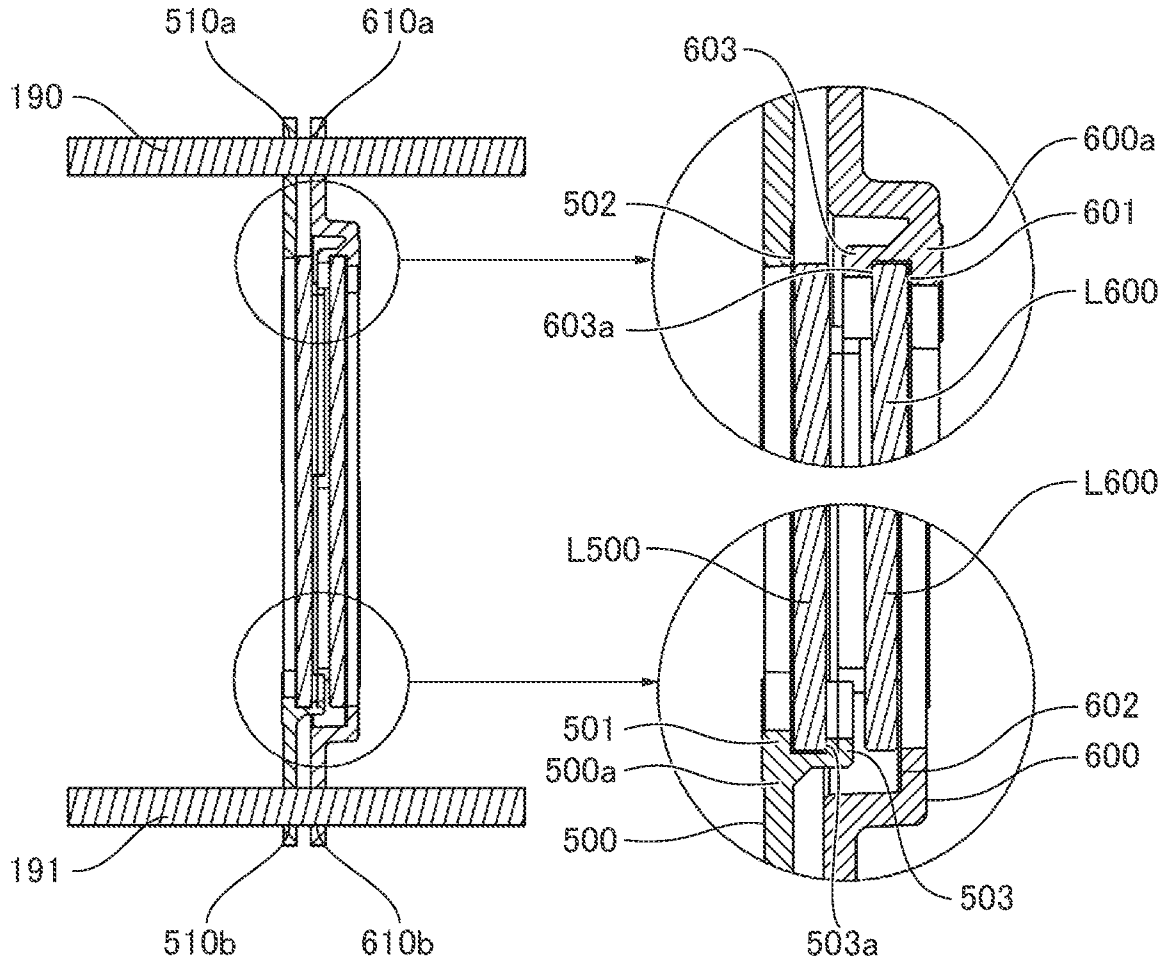
FIG. 13 is a cross-sectional view of the unit in the third embodiment.

FIG. 12 is a diagram of the unit including the third D lens holding frame as viewed from the X1 direction of the optical axis in the third embodiment. FIG. 13 is a cross-sectional view of the unit in third embodiment, showing a state in which the glasses are closest to each other.

The third D lens holding frame 500 serving as the first lens barrel and the fourth lens holding frame 600 serving as the second lens barrel have a sleeve hole 510*a* and a sleeve hole 610*a* corresponding to the main guide bar 190.

In addition, a sleeve hole 510*b* and a sleeve hole 610*b* corresponding to the sub-guide bar 191 are provided, and the guide bar and the sleeve hole are fitted to each other, so that the third D lens holding frame 500 and the fourth lens holding frame 600 are linearly guided in the optical axis direction.

The main guide bar 190 and the sub-guide bar 191 are held by a fixing member (not illustrated). Furthermore, a driving source (not illustrated) is connected to the third D lens holding frame 500 and the fourth lens holding frame 600, so that the third D lens holding frame 500 and the fourth lens holding frame 600 can be driven in the optical axis direction. The third D lens holding frame 500 is disposed as a group that moves during zooming.

The third D lens holding frame 500 in the third embodiment has a receiving portion 501 that supports a lens L500 serving as a first lens, and a caulking claw 503 serving as a first protruding portion that is disposed at a position facing the receiving portion 501 and regulates the position of the lens L500 in the optical axis direction.

The caulking claw 503 is a protruding portion that protrudes from the annular portion 500*a* in the optical axis direction (right direction in FIG. 13), and the caulking claw 503 has a position regulating surface 503*a* in the optical axis direction of the lens L500 serving as the first lens. In phases other than the phase in which the caulking claw 503 is disposed, the recess portion 502 that does not protrude in the optical axis direction is formed, and as will be described below, the caulking claw 603 of the fourth lens holding frame 600 enters in the optical axis direction (left direction in FIG. 13).

Similarly, the fourth lens holding frame 600 has a receiving portion 601 that supports the lens L600 serving as the second lens, and a caulking claw 603 serving as a second protruding portion that is disposed at a position facing the receiving portion 601 and regulates the position in the optical axis direction. The caulking claw 603 has a protruding shape extending from the annular portion 600*a* in the optical axis direction (the left direction in FIG. 13).

A part of the caulking claw 603 serves as a position regulating surface 603*a* in the optical axis direction of the lens L600. In the phase other than the phase in which the caulking claw 603 is disposed, the recess portion 602 that does not protrude in the optical axis direction is formed, and the caulking claw 503 enters in the optical axis direction (right direction in FIG. 13).

Note that the caulking claw is used to fix the position of the lens in the optical axis direction by heating and molding a holding frame made of a resin material to bring the holding frame into close contact with the lens. In the third embodiment, a configuration in adopted in which a caulking claw 503 serving as a first protruding portion and a caulking claw 603 serving as a second protruding portion are arranged in the same plane perpendicular to the optical axis.

The caulking claws 503 of the third D lens holding frame 500 are arranged only in three phases as viewed from the optical axis direction, and the caulking claws 603 of the fourth lens holding frame 600 enter the other phases in the optical axis direction (the left direction in FIG. 13). Therefore, the clearance between the third D lens holding frame 500 and the fourth lens holding frame 600 can be made smaller than that in the conventional configuration.

Consequently, the clearance between the lens barrels can be reduced, and miniaturization of the entire lens barrel can be realized. Although, in the explanation of the third embodiment, the first lens barrel is a zoom lens unit, and the optical unit is a focusing unit that is movable in the optical axis direction, the first lens barrel and the optical unit may respectively be a focusing unit or a zoom lens unit.

Furthermore, in the explanation of the third embodiment, although the protruding portion that regulates the position of the lens in the optical axis direction is a caulking claw, the protrusions of the adhesive portion in the case in which the space between the holding frame and the lens is fixed with UV adhesive or the like may respectively be the first protruding portion and the second protruding portion.

Fourth Embodiment

The fourth embodiment is a modified example of the configuration described in the first embodiment in which some components are replaced. Descriptions regarding some of the component layouts that are duplicate will be omitted because they have already been explained in the first embodiment. In the fourth embodiment, the first lens barrel is an optical adjustment group, and the optical unit is a light amount adjustment unit.

Figure 14:
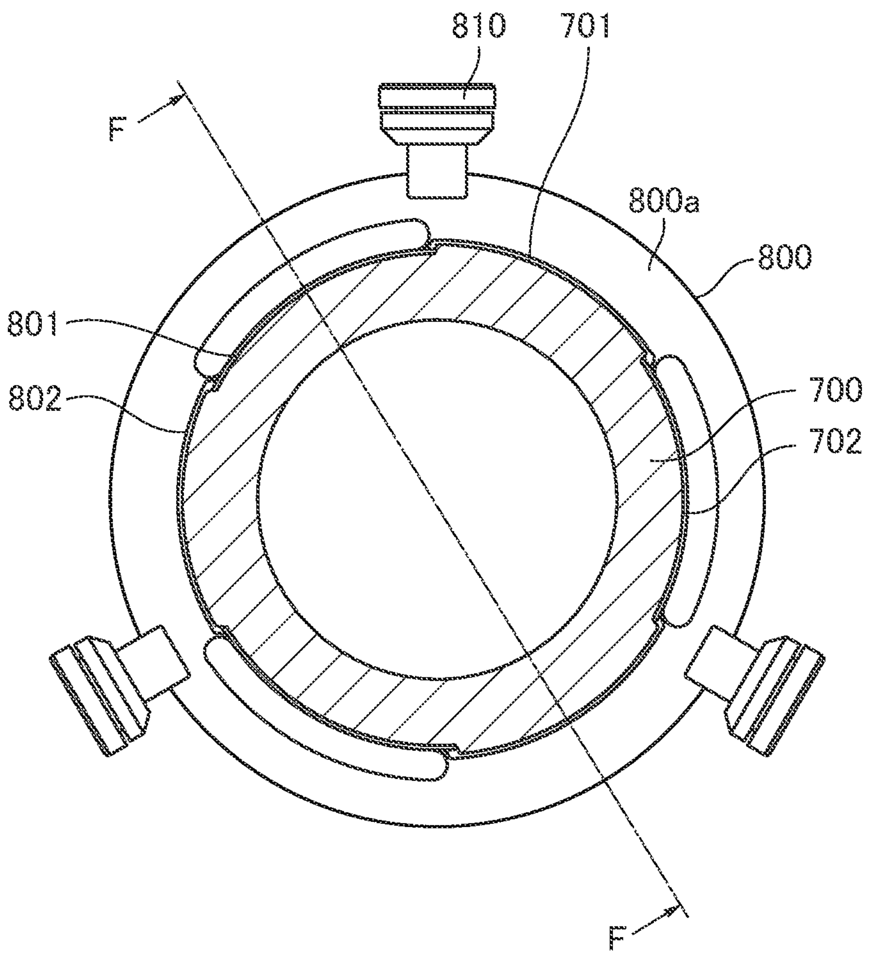
FIG. 14 is a diagram of the unit including the 3D lens holding frame as viewed from the X2 direction of the optical axis in the fourth embodiment.
Figure 15:
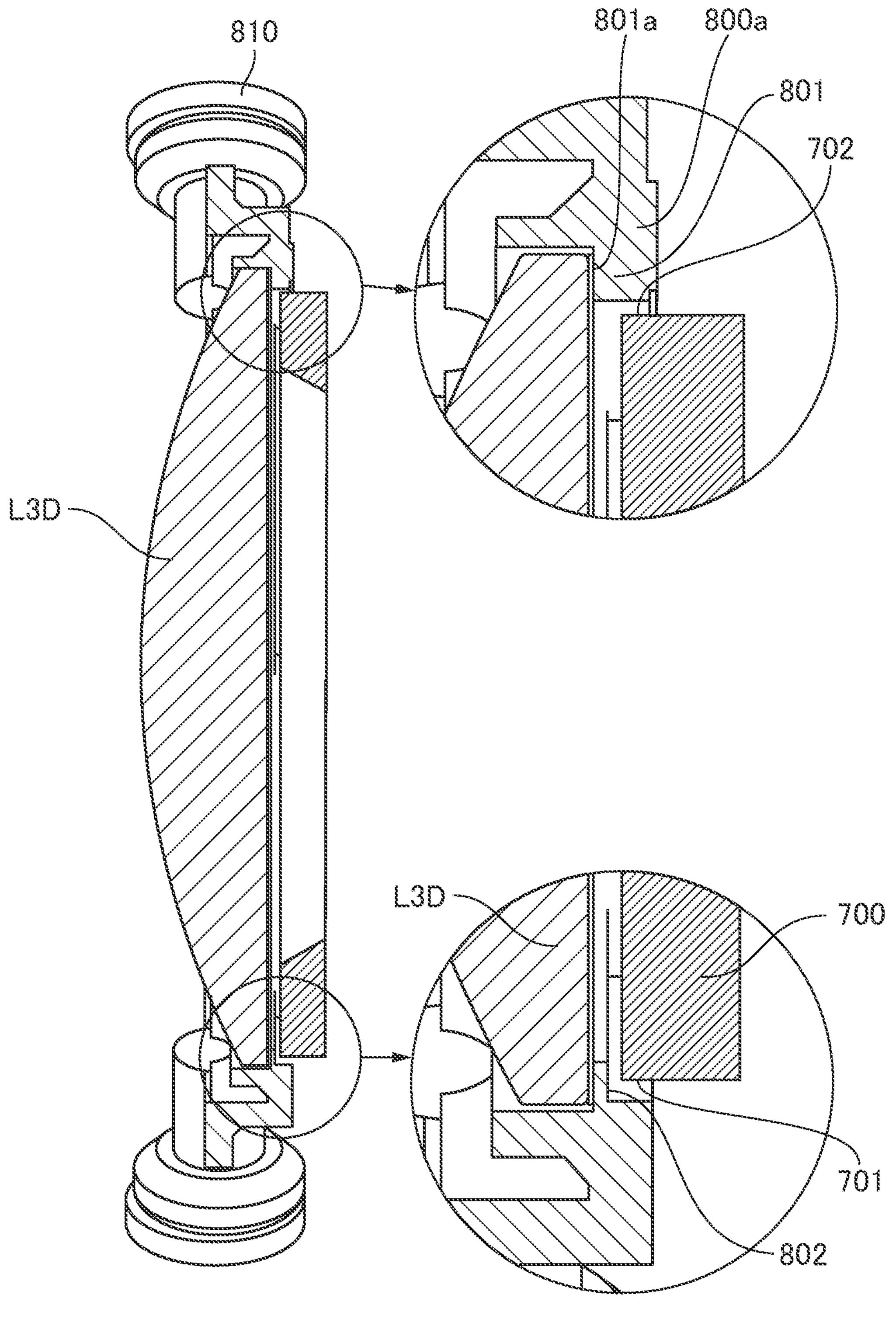
FIG. 15 is a cross-sectional view of the unit in the fourth embodiment.

FIG. 14 is a diagram of the unit including the third D lens holding frame as viewed from the X2 direction of the optical axis in the fourth embodiment, and FIG. 15 is a cross-sectional view of the unit in the fourth embodiment, showing a state in which the glasses are closest to each other.

The third D lens holding frame 800 has adjustment rollers 810 arranged in three phases, and is adjustably held by the rear group base 140 via the adjustment rollers 810, which has a holding configuration that is similar to the second embodiment.

Additionally, the third D lens holding frame 800 has an annular portion 800*a* and a receiving portion 801 serving as a first protruding portion that protrudes from the annular portion 800*a* in the optical axis direction and for holding the third D lens group L3D serving as a first lens.

In a phase other than the receiving portion 801 in the third D lens holding frame 800, a recess portion 802 is provided. The receiving portion 801 is a protruding portion that protrudes from the annular portion 800*a* toward the optical axis direction, and a part of the receiving portion 801 serves as a position regulating surface 801*a* of the third D lens group LSD in the optical axis direction.

In the fourth embodiment, an aperture unit 700 is disposed as an optical component (light amount adjustment unit) that is adjacent to the third D lens holding frame 800. In the aperture unit 700, a recess portion 702 is disposed corresponding to a phase of the receiving portion 801 of the third D lens holding frame 800, and a protruding portion 701 serving as a second protruding portion is disposed corresponding to a phase of the recess portion 802 of the third D lens holding frame 800.

Additionally, in the aperture unit 700, a motor unit (not illustrated) is driven to change the aperture size of the inner diameter opening portion, and thereby the amount of light can be adjusted.

In the fourth embodiment, a part of the receiving portion 801 serving as the first protruding portion and a part of the protruding portion 701 serving as the second protruding portion are disposed in the same plane perpendicular to the optical axis. Additionally, the receiving portions 801 of the third D lens holding frame 800 are disposed only in three phases as viewed from the optical axis direction, and the protruding portions 701 of the aperture unit 700 enter the other phases. Consequently, the clearance between the third D lens holding frame 800 and the aperture unit 700 can be made smaller than that in the conventional configuration.

Therefore, the clearance between the optical units can be reduced, and miniaturization of the entire lens barrel can be realized. Although, in the explanation of the fourth embodiment, the first lens barrel is an optical adjustment unit, and the optical unit is an aperture unit, the first lens barrel may be a focusing unit or a zoom lens unit.

Additionally, instead of the aperture unit, an electromagnetic drive unit, for example, an image stabilization unit, may be used. As described above, the first lens barrel and the optical unit include an arbitrary combination of the fixed lens barrel, the optical adjustment group, the focusing unit, the zoom lens unit, and the drive unit.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, the present invention is useful for optical equipment such as video cameras and digital cameras. Additionally, the present invention includes the following combinations.

This application claims the benefit of Japanese Patent Application No. 2022-145314, filed on Sep. 13, 2022, which is hereby incorporated by reference herein in its entirety.

What is claimed is:

1. A lens barrel comprising:

a first lens barrel configured to hold a first lens; and an optical unit having a hold part for holding an optical element, wherein the first lens barrel and the optical unit are disposed adjacent to each other, wherein an interval between the first lens barrel and the optical unit in an optical axis direction is variable, wherein an annular portion of the first lens barrel has first protruding portions in two or more phases, wherein the first protruding portion regulates a position of the first lens in the optical axis direction, wherein a second protruding portion of the hold part is disposed in a phase other than the two or more phases of the first protruding portion, wherein, when the first lens barrel and the optical unit come close to each other in the optical axis direction, a state of the lens barrel changes from a first state to a second state, the first state being a state in which a part of the first protruding portion and a part of the second protruding portion are not disposed in the same plane perpendicular to an optical axis, the second state being a state in which the part of the first protruding portion and the part of the second protruding portion are disposed in the same plane perpendicular to the optical axis, wherein a first light shielding sheet is disposed between the first lens and the first protruding portion, and wherein a second light shielding sheet is disposed on the first lens side of the second protruding portion.

2. The lens barrel according to claim 1, wherein the optical element is a lens.

3. The lens barrel according to claim 1, wherein the optical unit is movable in the optical axis direction.

4. The lens barrel according to claim 3, wherein the optical unit is movable to perform a focusing or a zooming operation.

5. The lens barrel according to claim 3, wherein the first lens barrel is fixed in the optical axis direction.

6. The lens barrel according to claim 3, wherein the first lens barrel is movable in the optical axis direction.

7. The lens barrel according to claim 6, wherein the first lens barrel is movable to perform a focusing or a zooming operation.

8. The lens barrel according to claim 1, wherein the first protruding portion is a caulking claw that protrudes from the annular portion of the first lens barrel in the optical axis direction.

9. The lens barrel according to claim 1, wherein the first protruding portion protrudes from the annular portion in a direction orthogonal to the optical axis.

10. The lens barrel according to claim 1, wherein in a state in which the first lens barrel and the optical unit are closest to each other, a part of the first protruding portion and a part of the second protruding portion are arranged on a circumference centered on the optical axis, in a plane perpendicular to the optical axis.

11. The lens barrel according to claim 1, wherein the first protruding portion protrudes from the annular portion of the first lens barrel in the optical axis direction, and wherein the first protruding portion has a position regulating surface of the first lens in the optical axis direction.

12. The lens barrel according to claim 1, wherein the first protruding portion regulates a position of the first lens in the optical axis direction by contacting the first lens.

13. The lens barrel according to claim 1, wherein the first protruding portion has a protruding portion having a position regulating surface of the first lens in the optical axis direction.

* * * * *